United States Patent [19]

Iwata et al.

[11] 4,054,640
[45] Oct. 18, 1977

[54] METHOD OF REMOVING NITROGEN OXIDES FROM AN EXHAUST

[75] Inventors: Tomoji Iwata, Kawasaki; Sanseki Moriguchi, Yokohama; Hiroshi Abe, Kanagawa, all of Japan

[73] Assignee: Nippon Kokan Kabushiki Kaisha, Tokyo, Japan

[21] Appl. No.: 685,684

[22] Filed: May 12, 1976

[30] Foreign Application Priority Data

May 16, 1975 Japan .................................. 50-58266

[51] Int. Cl.² ........................................... B01D 53/34
[52] U.S. Cl. .................................... 423/239; 75/1 R; 23/288 G
[58] Field of Search ...................... 423/213.5, 239, 659; 252/411 R, 472; 23/288 G; 75/1 R

[56] References Cited

U.S. PATENT DOCUMENTS 2,755,174  7/1956  Weber ............................ 423/288 G
3,959,440  5/1976  Mizuno et al. ................... 423/242 X

FOREIGN PATENT DOCUMENTS 109,056  7/1918  United Kingdom ................ 252/472

*Primary Examiner*—G. O. Peters
*Attorney, Agent, or Firm*—Flynn & Frishauf

[57] ABSTRACT

A method of removing nitrogen oxides from an exhaust which comprises the steps of contacting an exhaust containing nitrogen oxides and ammonia with a reducing catalyst received in a reactor to reduce the nitrogen oxides to nitrogen gas, wherein iron ore catalyst lumps having a particle size of 25 mm or less and forming a catalyst bed in the reactor are used as a reducing catalyst; the iron ore lumps of the catalyst bed are let to fall gravitationally through the reactor continuously or intermittently; and the iron ore catalyst lumps discharged from the reactor are either used as raw material for iron manufacture or fed back to the reactor to be reused as a reducing catalyst after being sieved.

11 Claims, 4 Drawing Figures

METHOD OF REMOVING NITROGEN OXIDES FROM AN EXHAUST

This invention relates to a method of removing nitrogen oxides from an exhaust by means of ammonia and reducing catalyst. Removal of nitrogen oxides (abbreviated as "NOx") from an exhaust, for example, that discharged from a combustion furnace is extremely important for prevention of air polution. Among the known processes of eliminating $NO_x$ from a plant exhaust is that of the U.S. Pat. No. 3,008,796 which uses ammonia gas as a reducing agent. The fundamental reaction of this process is found to proceed as follows:

  (1)

  (2)

The above reactions are catalytically carried out with flue gas temperature set at 250° to 450° C.

A catalyst applied for removal of $NO_x$ from an exhaust is generally of a composite type prepared by causing special compounds of metals such as copper, iron, nickel and cobalt to be borne by carrier of alumina or silica.

The flow sheet of FIG. 1 schematically illustrates a general prior art process of catalytically removing $NO_x$ from an exhaust. Referring to FIG. 1, an exhaust 1 is conducted by a blower 2 through a flue and heat exchanger 3 to a furnace 4, where the exhaust 1 is heated to 250° to 450° C. The exhaust heated to this level of temperature in the furnace 4 is mixed with ammonia gas 5 of a molar number 1 to 2 fold larger than that of $NO_x$ contained in the exhaust, and then brought into a reactor 6. The reactor 6 is packed with a catalyst carrying any of the aforesaid metal compounds. While passing through a bed 7 of said catalyst, a mixture of an exhaust containing $NO_x$ and an ammonia gas carries out the previously described reactions (1) and (2). As the result, $NO_x$ is reduced to $N_2$ and becomes harmless, thereby cleaning an exhaust. A harmless, clean gas 8 which has passed through the reactor 6 is brought back to the heat exchanger 3 to heat a raw exhaust and expelled into the air from a chimney 9 after heat recovery.

However, the above-mentioned prior art process of removing $NO_x$ from an exhaust is still accompanied with the following drawbacks:

1. Where an exhaust contains a large amount of dust, the dust settles on the catalyst bed 7 packed in the reactor 6 to plug interspaces between individual iron ore lumps forming the catalyst bed 7, giving rise to an increase in a pressure difference $\Delta p$ between a gas at the inlet of the catalyst bed 7 and a gas at the outlet of said catalyst bed 7. As the $NO_x$-removing plant is operated longer, said pressure difference $\Delta p$ becomes larger to obstruct the passage of an exhaust through the catalyst bed 7, sometimes resulting in the failure of said plant operation.

There is now described a case where it is desired to remove $NO_x$ from an exhaust emitted from an iron ore sintering plant. Where an exhaust from said sintering plant which has been previously treated by an electrostatic precipitator (and contains 50 to 100mg/$Nm^3$ of dust) passes through a $NO_x$-removing plant having a capacity of treating 1000 $Nm^3$/hr of an exhaust containing $NO_x$, then the aforesaid pressure difference $\Delta p$ increases to 60 to 100 mm water column when the $NO_x$-removing plant is operated for 24 hours.

2. Where a composite catalyst used with the $NO_x$-removing plant has fully lost a cattallytically reducing power, then said catalyst becomes unadapted to be effectively utilized in any other application and is unavoidably wasted. What is worse, some catalysts contain substances harmful to living creatures and should be thrown away only after such toxic matter is extracted to be rendered harmless.

3. A composite catalyst generally requires high purity chemicals for manufacture any demands a complicated process of synthesis, resulting in a prohibitively high cost. For illustration, such catalyst for a $NO_x$-removing plant is as expensive as 7,000 to 10,000 dollars per $m^3$.

It is accordingly an object of this invention to provide an inexpensive method of removing $NO_x$ from an exhaust.

Another object of the invention is to provide a method of removing $NO_x$ from an exhaust which can prevent interspaces between individual iron ore lumps packed as a catalyst bed in a reactor from being plugged with, for example, dust contained in an exhaust.

Still another object of the invention is to provide a method of removing $NO_x$ from an exhaust which can effectively utilize a used reducing catalyst without wasting it.

A further object of the invention as to provide an advantageous method of removing $NO_x$ from an exhaust from an iron ore sintering plant.

SUMMARY OF THE INVENTION

According to an aspect of this invention, there is provided a method of removing $NO_x$ from an exhaust which comprises the steps of contacting an exhaust containing $NO_x$ and ammonia with lumps of iron ore crushed to a particle size of 25 mm or less to be used as a catalyst and packed in a reactor in the form of a catalyst bed; discharging at least part of the catalyst bed in sucession; and utilizing the iron ore catalyst lumps thus discharged as raw material for iron manufacture.

Iron ore catalyst lumps leaving the reactor are sieved by a 2-to-6 mm screen. Larger iron ore catalyst lumps not sieved by the screen are repeatedly fed back as a reducing catalyst to the $NO_x$-removing plant or charged intact in a blast furnace as raw material for iron manufacture. Smaller iron ore catalyst chips obtained as screenings from said screen are transferred to, for example, a sintering or pelletizing plant to be converted into lumps having a sufficiently large size to be charged in a blast furnace.

Iron ore catalyst lumps used with the $NO_x$-removing plant of this invention are preferred to have a particle size of 3 to 25 mm.

The preferred iron ores used as a reducing catalyst for the object of this invention are hematite such as blends of fine iron ores for a sintering plant, Robe River ore, Timblo ore and Goa ore.

BRIEF DESCRIPTION OF THE DRAWINGS

This invention can be more fully understood from the following detailed description when taken in connection with the accompanying drawings in which.

DETAILED DESCRIPTION

Figure 1:
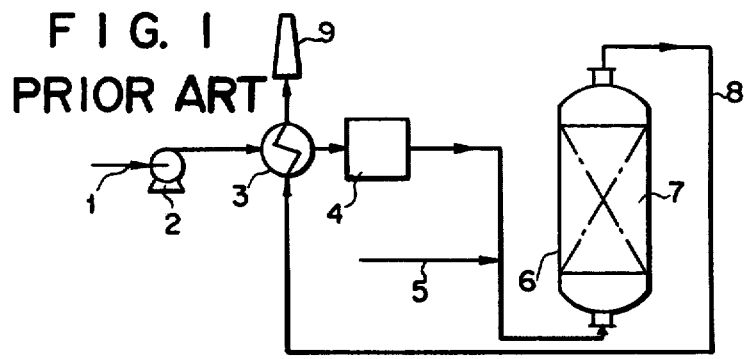
FIG. 1 shows a flow sheet of a prior art process of removing $NO_x$ from an exhaust.
Figure 2:
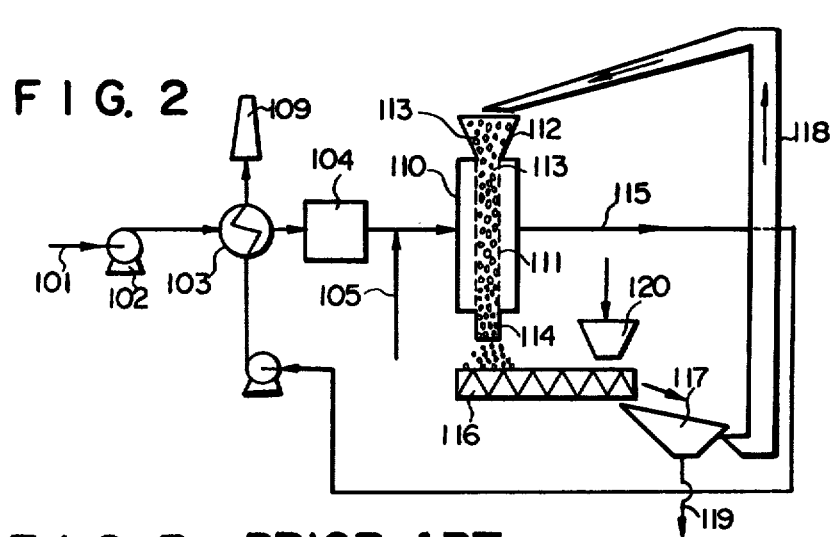
FIG. 2 is a flow sheet of a method embodying this invention for removing $NO_x$ from an exhaust.

There will now be described by reference to the flow sheet of FIG. 2 a $NO_x$-removing plant according to an embodiment of this invention. An exhaust 101 containing $NO_x$ is conducted to a heat exchanger 103 by a blower 102 and then to a furnace 104 to be preheated to 250° to 450° C. Ammonia is mixed with the exhaust thus heated. The mixed gases are brought into an upright reactor 110. Received in this reactor 110 is a porous container 111 made of, for example, a wire net or iron plate bored with a large number of holes or slits. The container 111 is packed with iron ore catalyst lumps having a particle size of 25 mm or less. The upper part of the reactor forms a hopper 112. Iron ore catalyst lumps constituting a catalyst bed 113 held in airtightness in the hopper 112 are let to fall gravitationally through the porous container 111 of the reactor 110 and partly discharged in succession at the outlet 114.

While a mixture of an exhaust and ammonia passes through interspaces between individual iron ore catalyst lumps received in the reactor 110, $NO_x$ contained in the exhaust is converted into nitrogen gas by reducing reaction with ammonia gas and expelled into the air in the form of a harmless, clean gas 115.

It is obviously possible to render the iron ore hopper 112 and outlet 114 more airtight mechanically by means of, for example, a roll feeder.

The catalyst bed 113 received in the porous container 111 of the reactor 110 gravitationally falls through said reactor 110 continuously or intermittently, is partly discharged in succession, for example, by a screw conveyer 116, and sieved, for example, a vibrating screen 117. The screen 117 is provided with 2-to-6 mm mesh. Larger iron ore catalyst lumps not sieved by said screen 117 are returned to the hopper 112 by means of, for example, a bucket elevator 118, and repeatedly fed back as a catalyst to the $NO_x$-removing plant from said hopper 112. Some portions of larger catalyst lumps not sieved by the screen 117 may also be charged intact in a blast furnace (not shown) as raw material for iron manufacture.

The screenings 119 of smaller iron ore catalyst chips obtained from the screen 117 which contain fine ore and coal dust are charged in a sintering or pelletizing plant (not shown) to be converted into sufficiently large lumps to be charged in a blast furnace.

A treated clean, harmless exhaust gas 115 obtained by the above-mentioned treatment and still kept at a high temperature is carried into the heat exchanger 103 by means of a blower, if necessary, to be utilized in the heating the raw exhaust 101 and also for control of pressure in the reactor 110.

While being carried downward through the reactor 110 continuously or intermittently, iron ore lumps forming the catalyst bed 113 are partly broken. Therefore, an amount of fresh iron ore catalyst lumps corresponding to screenings 119 obtained from the screen 117 is additionally supplied from a catalyst hopper 120 to the reactor 110.

Figure 3:
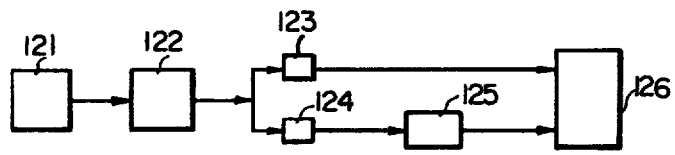
FIG. 3 is a flow sheet of a prior art process of treating iron ores.

FIG. 3 is a flow sheet of the prior art process of crushing iron ore as a charge in a blast furnace. Raw iron ore 121 is treated by crushing and screening means 122 and sorted into lumps 123 and fine particle 124. The lumps 123 are charged intact in a blast furnace 126, whereas the fine particles 124 are pretreated, for example, in a sintering or pelletizing plant 125 to be converted into lumps having a sufficiently large size to be charged in the blast furnace 126.

Figure 4:
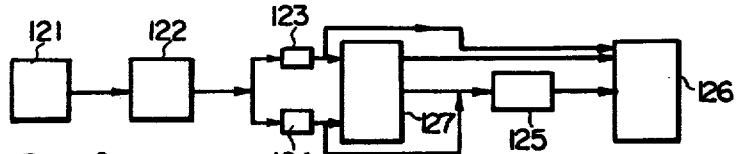
FIG. 4 is a flow sheet of a method embodying the invention for treating iron ores.

In contrast, iron ore used with the $NO_x$-removing plant of this invention is treated by a process shown by the flow sheet of FIG. 4. Namely, both lumps 123 and smaller chips 124 having a particle size of 25 mm or less of raw iron ore 121 which are obtained by subjecting said raw iron ore 121 to crushing and screening are used as a catalyst 127 for the above-mentioned plant of this invention.

When the crushed iron ore catalyst 127 is sieved by the 2-to-6 mm screen, the nonscreenable portions are either reused as a catalyst for the $NO_x$-removing plant of this invention or charged intact in the blast furnace 126. On the other hand, screenings obtained from said 2-to-6 mm screen are further treated in a pelletizing plant 125 together with fine particles 124 of iron ore to be converted into lumps having a sufficiently large size to be charged in the blast furnace 126.

This invention will be more fully understood by reference to the following example.

$NO_x$ contained in an exhaust were removed according to the flow sheet of FIG. 2 under the conditions given below:

| | |
|---|---|
| Reactor: | Capable of treating an exhaust at the rate of 1000 $Nm^3$/hr. |
| Kind of exhaust: | Exhaust from an iron ore sintering plant |
| Amount of dust contained in the exhaust: | About 50 mg/$Nm^3$ |
| Amount of $NO_x$ contained in the exhaust: | 170 to 200 ppm |
| Amount of $SO_2$ contained in the exhaust: | 280 to 300 ppm |
| Amount of $SO_2$ contained in the exhaust after desulfurized: | 10 to 20 ppm |
| Amount of ammonia added: | 300 ppm |
| Catalyst: | Iron ore lumps having an average particle size of 6 mm and nonpassable through a 3 mm screen for classifying of blends of fine iron ore particles being charged in a sintering plant |
| Hourly space velocity: | 5000/hr |
| Reactor inlet temperature: | 400° to 420° C |

A difference $\Delta p$ between pressure levels occurring at the inlet and outlet of the catalyst bed 113 as measured with respect to an exhaust substantially stripped of $SO_2$ by desulfurizing plant (not shown) was compared with a similar pressure difference $\Delta p$ as measured with respect to an exhaust which was not desulfurized but contained $SO_2$, the results being set forth in Table 1 below.

Table 1

| Item of measurement | Kind of exhaust | Nondesulfurized | Desulfurized |
|---|---|---|---|
| Rate of removing nitrogen oxides | 400° C | 94.8% | 95.8% |
| | 420° C | 97.5% | 96.5% |
| Δp | With the immovable catalyst bed | 60 to 90 mm water column when the $NO_x$-removing plant was operated 24 hours | 20 to 60 mm water column when the $NO_x$-removing plant was operated 96 hours |
| | With the movable catalyst bed | Increased to 10 mm or less, each time one third of the catalyst bed received in the reactor is intermittently discharged every 8 hours | Increased to 10 mm or less, when one third of the catalyst bed received in the reactor is intermittently discharged once a day |

When tests were made by letting a catalyst bed to fall through the reactor continuously for one month to discharge a certain amount of said bed in succession, the catalyst did not present any decline in the efficiency of removing $NO_x$.

This invention has the advantages that since a catalyst bed is let to fall continuously or intermittently through the reactor with the required replenishment of fresh catalyst, interspeces between individual iron ore lumps forming said catalyst bed are thoroughly prevented from being plugged with dust carried into a exhaust; and the cost of eliminating $NO_x$ from an exhaust is extremely lower than is the case with the prior art process, because the catalyst is formed of iron ore whose cost is about one-hundredth of that of a composite catalyst used with the conventional $NO_x$-removing process, and moreover said iron ore can be either reused as a catalyst or charged intact in a blast furnace.

What we claim is:

1. In a method of removing nitrogen oxides from an exhaust which comprises contacting ammonia and an exhaust containing nitrogen oxides with a reducing catalyst of iron ore lumps received in a reactor to convert the nitrogen oxides into nitrogen gas, the improvement comprising:
feeding iron ore catalyst lumps with a particle size of 25 mm or less to the reactor in the form of a movable bed so that said iron ore catalyst lumps are partly discharged from the reactor in succession;
sieving the iron ore catalyst lumps discharged from the reactor by a 2 to 6 mm screen;
repeatedly feeding back at least a portion of the larger iron ore catalyst lumps not sieved by said screen to the movable bed of reducing catalyst for again passing through the reactor;
transferring the screenings of smaller iron ore catalyst lumps obtained by passing through the screen to a sintering or pelletizing plant to be converted into lumps having a sufficiently large particle size to be charged in a blast furnace for iron manufacture; and
charging fresh iron ore catalyst lumps having a particle size of 25 mm or less into the reactor to replenish the discharged and transferred portion of said iron ore catalyst lumps.

2. A method according to claim 1, wherein the lumps of the reducing iron ore catalyst fed to the reactor have a particle size of 3 to 25 mm.

3. A method according to claim 1, comprising feeding at least a portion of the larger iron ore catalyst lumps not sieved by the 2-to-6 mm screen intact into a blast furnace.

4. A method according to claim 1, wherein the exhaust is an exhaust from an iron manufacturing plant.

5. A method according to claim 4, wherein the exhaust is an exhaust from an iron ore sintering plant.

6. A method according to claim 1, wherein said step of charging fresh iron ore catalyst lumps comprises charging said fresh iron ore catalyst lumps to the sieve in the first instance.

7. In a method of removing nitrogen oxides from an exhaust which comprises contacting ammonia and an exhaust containing nitrogen oxides with a reducing catalyst of iron ore lumps received in a reactor to convert the nitrogen oxides into nitrogen gas, the improvement comprising:
feeding iron ore catalyst lumps with a particle size of 25 mm or less to the reactor in the form of a movable bed so that said iron ore catalyst lumps are partly discharged from the reactor in succession;
sieving the iron ore catalyst lumps discharged from the reactor by a 2 to 6 mm screen;
feeding at least a portion of the larger iron ore catalyst lumps not sieved by said screen intact in a blast furnace;
transferring the screenings of smaller iron ore catalyst lumps obtained by passing through the screen to a sintering or pelletizing plant to be converted into lumps having a sufficiently large particle size to be charged in a blast furnace for iron manufacture; and
charging fresh iron ore catalyst lumps having a particle size of 25 mm or less into the reactor to replenish the discharged and transferred portion of said iron ore catalyst lumps.

8. A method according to claim 7, wherein the exhaust is an exhaust from an iron manufacturing plant.

9. A method according to claim 7, wherein the exhaust is an exhaust from an iron ore sintering plant.

10. A method according to claim 7, wherein the lumps of the reducing iron ore catalyst fed to the reactor have a particle size of 3 to 25 mm.

11. A method according to claim 7, wherein said step of charging fresh iron ore catalyst lumps comprises charging said fresh iron ore catalyst lumps to the sieve in the first instance.

* * * * *